(12) United States Patent
Birkholz et al.

(10) Patent No.: US 10,107,430 B2
(45) Date of Patent: Oct. 23, 2018

(54) HOSE-LINE CONNECTOR AND LINE SET

(71) Applicant: VOSS Automotive GmbH, Wipperfürth (DE)

(72) Inventors: Thomas Birkholz, Gummersbach (DE); Reinhard Plietsch, Wermelskirchen (DE)

(73) Assignee: VOSS AUTOMOTIVE GMBH, Wipperfurth (DE)

( * ) Notice: Subject to any disclaimer, the term of this patent is extended or adjusted under 35 U.S.C. 154(b) by 454 days.

(21) Appl. No.: 14/771,985

(22) PCT Filed: Mar. 5, 2014

(86) PCT No.: PCT/EP2014/054214
§ 371 (c)(1),
(2) Date: Sep. 1, 2015

(87) PCT Pub. No.: WO2014/139841
PCT Pub. Date: Sep. 18, 2014

(65) Prior Publication Data
US 2017/0241579 A1   Aug. 24, 2017

(30) Foreign Application Priority Data

Mar. 11, 2013 (DE) .......................... 10 2013 102 413

(51) Int. Cl.
*F16L 33/025* (2006.01)
*F16L 33/207* (2006.01)

(52) U.S. Cl.
CPC ......... *F16L 33/025* (2013.01); *F16L 33/2071* (2013.01)

(58) Field of Classification Search
USPC .......................................... 285/239–242, 259
See application file for complete search history.

(56) References Cited

U.S. PATENT DOCUMENTS

| | | | | |
|---|---|---|---|---|
| 589,216 A | * | 8/1897 | McKee | F16L 33/30 285/239 |
| 2,139,745 A | * | 12/1938 | Goodall | F16L 33/23 285/251 |

(Continued)

FOREIGN PATENT DOCUMENTS

| | | |
|---|---|---|
| DE | 102011016496 A1 | 10/2012 |
| FR | 1199001 A | 12/1959 |
| WO | WO 2009/074479 A1 | 6/2009 |

OTHER PUBLICATIONS

International Search Report of International Application No. PCT/EP2014/054214 dated Apr. 30, 2014, 3 pages.

*Primary Examiner* — Aaron M Dunwoody
(74) *Attorney, Agent, or Firm* — Eric J. Sosenko; Jonathan P. O'Brien; Honigman Miller Schwartz and Cohn LLP

(57) ABSTRACT

A hose-line connector, with a connection part having at least one elongated hose connection for slipping a hose line onto the hose connection. The hose connection has a sealing segment having a circumferential sealing surface at a free front end and a retaining segment axially adjacent thereto as a clamping region for the circumferential radial clamping of a hose line. On the outer circumference of the retaining segment, the retaining segment has a radially protruding rib structure, which includes at least one circumferential rib in the form of an annular ridge and at least two longitudinal rib distributed about the circumference and extending axially or at an angle to the axial direction.

26 Claims, 6 Drawing Sheets

(56) References Cited

U.S. PATENT DOCUMENTS

| | | | | |
|---|---|---|---|---|
| 2,147,355 | A | * | 2/1939 | Scholtes ............... F16L 33/213 285/258 |
| 2,230,115 | A | * | 1/1941 | Kreidel ................ F16L 19/045 285/248 |
| 3,017,203 | A | * | 1/1962 | MacLeod ................ F16L 31/00 285/256 |
| 4,330,142 | A | * | 5/1982 | Paini ....................... B21C 37/20 285/253 |
| 6,318,763 | B1 | * | 11/2001 | Huang ............... F16L 33/2078 285/256 |
| 8,287,007 | B2 | * | 10/2012 | Reiter ............... F02M 51/0682 285/239 |
| 8,556,300 | B2 | * | 10/2013 | Isenburg ............... F16L 53/008 174/59 |
| 2010/0109319 | A1 | | 5/2010 | Zhang et al. |
| 2013/0214528 | A1 | | 8/2013 | Mitterer et al. |
| 2015/0219260 | A1 | * | 8/2015 | Kury .................. F16L 33/2076 285/256 |
| 2015/0226356 | A1 | * | 8/2015 | Kury .................. F16L 33/2076 285/256 |

\* cited by examiner

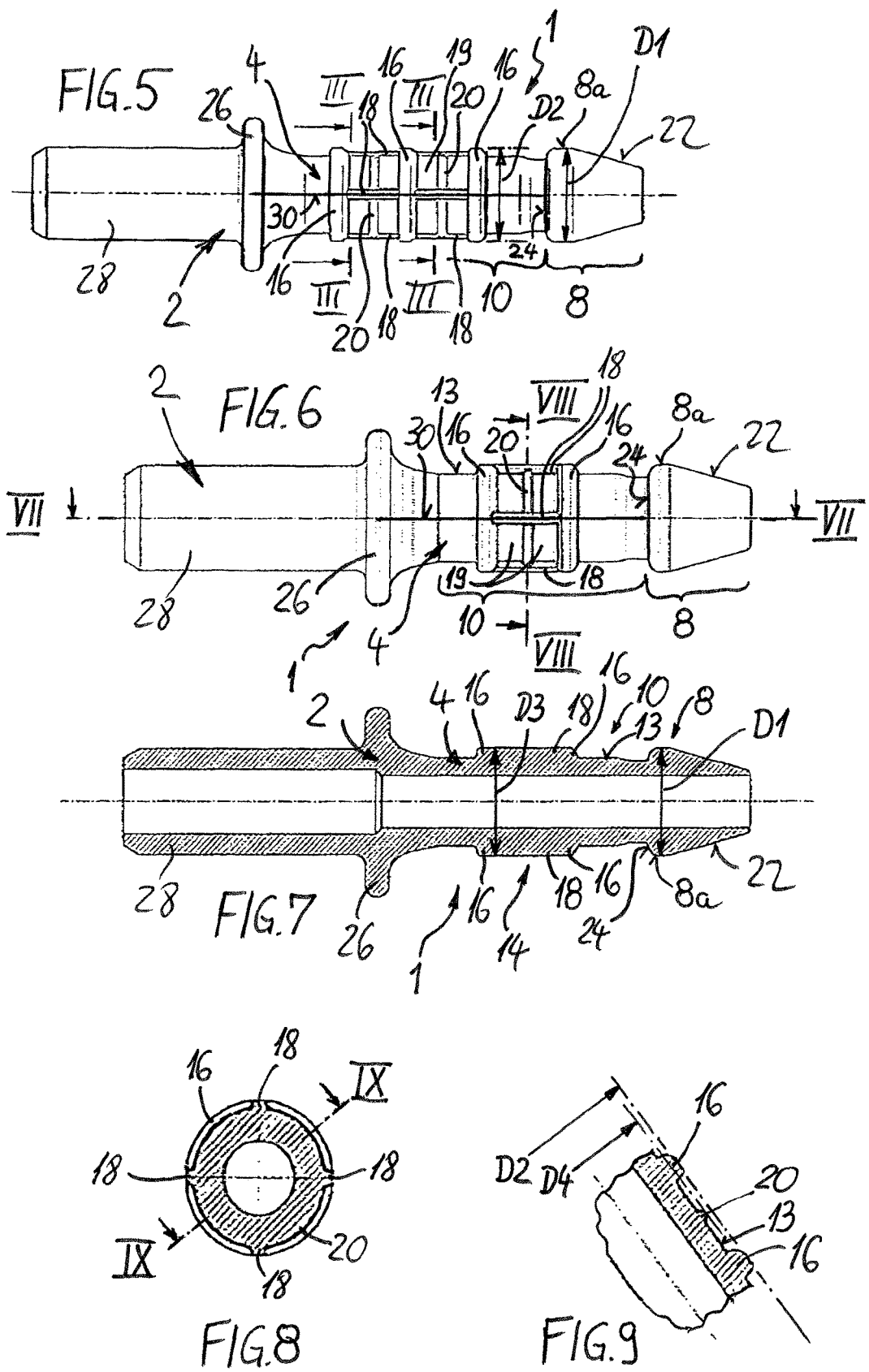

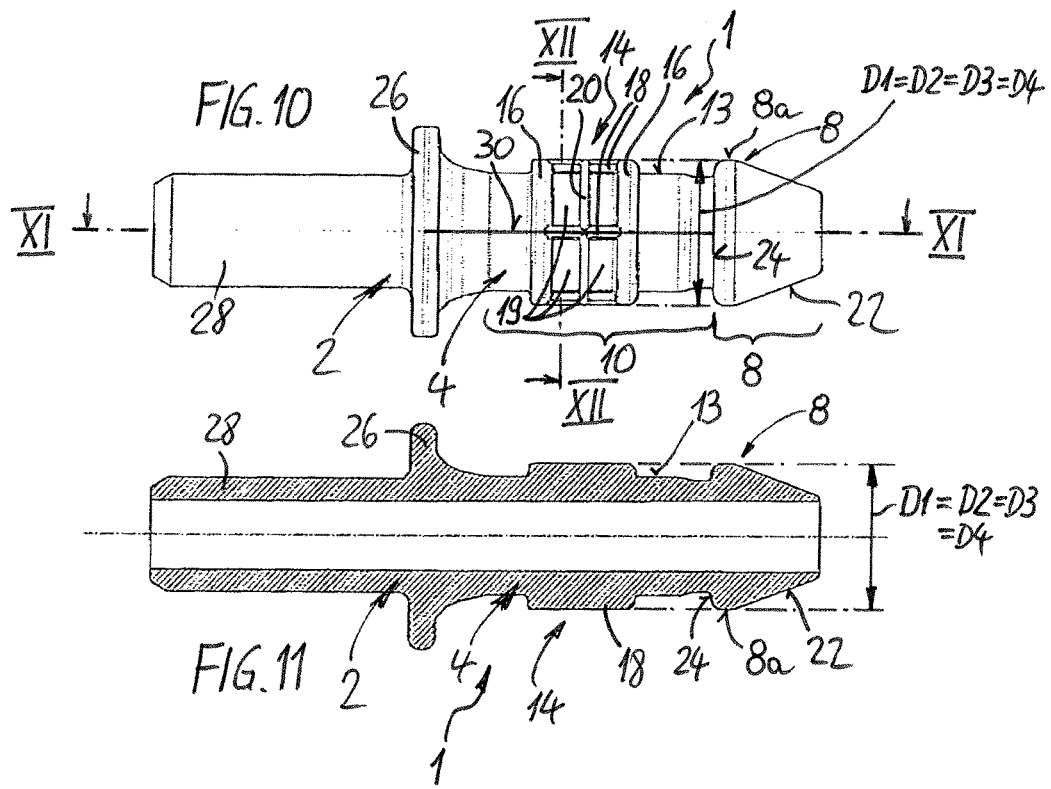
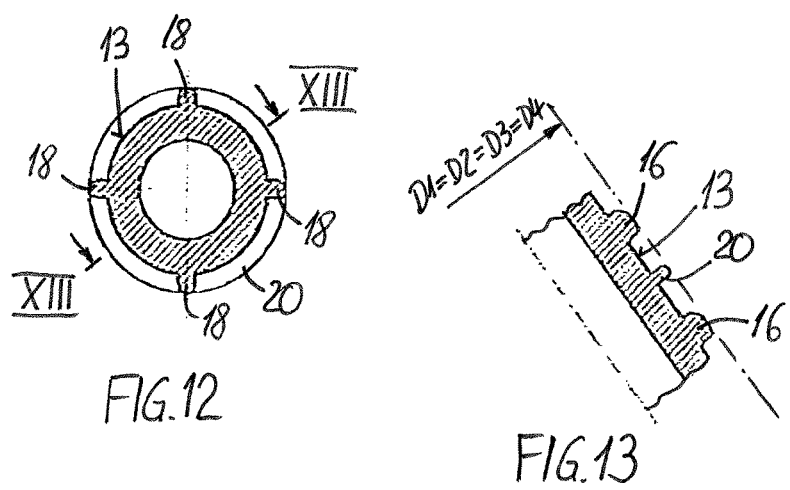

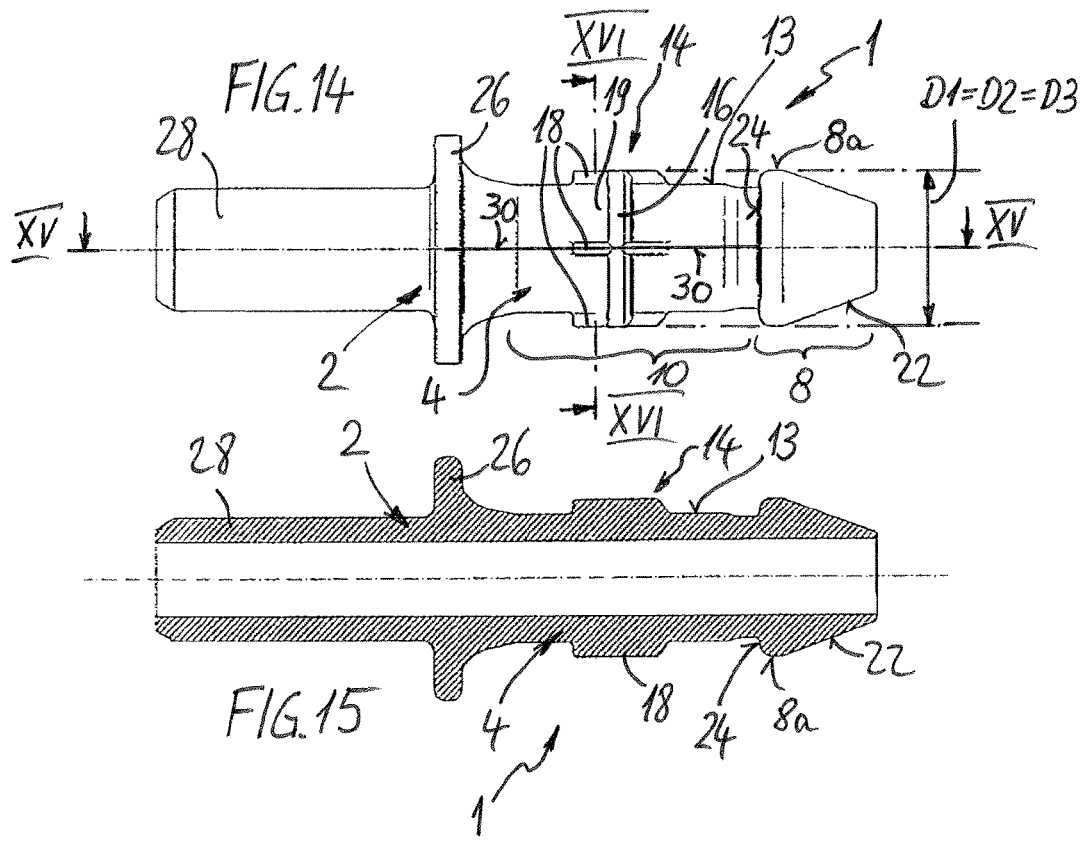
FIG. 14
FIG. 15
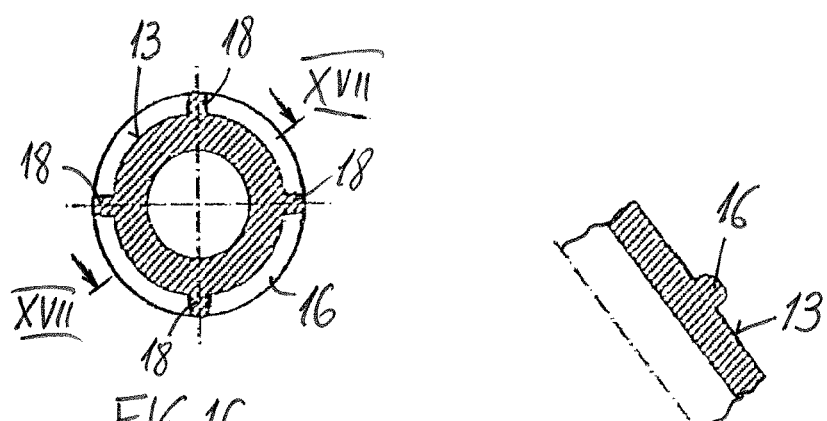
FIG. 16
FIG. 17

HOSE-LINE CONNECTOR AND LINE SET

FIELD

The present invention relates to a hose-line connector with a connection part having at least one elongated hose connection for slipping a hose line onto the at least one hose connection, wherein the hose connection has a sealing segment having a circumferential sealing surface at a free front end and a retaining segment axially adjacent thereto as a clamping region for the circumferential radial clamping of a hose line that is slipped on.

In addition, the invention also relates to a line set with one hose line and at least one hose-line connector of the described kind.

BACKGROUND

By way of explanation it should be said that a hose line within the meaning of this invention means a flexible media line for liquids or gases which has a flexible and preferably to a certain extent elastically stretching hose wall. The hose wall can be of single or multiple-layer design, for example comprising an inner layer, at least one pressure-resistant layer and also at least one additional layer, in particular an outer layer. The pressure-resistant layer forms the armoring to accommodate the internal media pressures.

A hose-line connector of the generic kind and also a line set are described in document WO 2009/074479 A1. The retaining segment in the hose connection of this known connector is designed with a cylindrical circumferential surface adjacent to a radial retaining stage at the transition to the pressure segment. In order to ensure a good hold of the slipped on hose line with good interior seal between the sealing segment and the inner surface of the hose line, the hose line on the known connection is radially clamped in two axially sequential clamping regions, and specifically on one side in the region of the retaining segment, but also on the other side in the region of the sealing segment. Due to the double radial clamping, the hose assembly is somewhat cumbersome.

The object of the present invention is to improve a hose-line connector of the described, generic kind such that with a simplified hose assembly, optimum hose mounting and sealing is nonetheless assured.

SUMMARY

This disclosure provides that on the outer circumference of the retaining segment there is a radially protruding rib structure which has at least one circumferential rib in the form of an annular ridge and/or at least one longitudinal rib distributed over the circumference and extending axially and/or at an angle to the axial direction. In one preferred embodiment, the rib structure features at least one circumferential rib and at least one longitudinal rib, wherein the term "longitudinal rib" means that it proceeds at least in part in an axial or axis-parallel direction and/or possibly in part at a slant and thus also in part proceeds e.g. in a threaded-like manner in the circumferential direction. Also a zig-zag-like or meandering progression of the/each "longitudinal rib" can be used, for example, so that the or each longitudinal rib runs with a practically randomly shaped progression, both in the axial direction and also in the circumferential direction in the region of the retaining segment across the outer circumference of the hose connection. One factor here is that due to the rib structure, chamber-like recesses are formed between each of the ribs. The retaining segment designed in this manner ensures a very tight, reliable hose connection, and as a specific, added advantage with only one radial clamp in the region of the retaining segment, since in the radially clamped state of the hose line, its hose wall is pressed under elastic deformation onto the rib structure. Thus the hose wall is pressed in regions into the chamber-like recesses formed between the ribs, so that the hose wall practically surrounds the ribs up to the otherwise cylindrical perimeter of the retaining segment, and thus promotes a positive-locking connection. In this regard the at least one circumferential rib causes retention in the axial direction, and the horizontal ribs secure the hose line against twisting around the connection longitudinal axis.

Without this torsion-safe feature according to the invention, that is, with only at least one circumferential rib and without the invented longitudinal ribs, then in principle potential twisting would promote an axial displacement of the line on the hose connection, so that the hose line could move at least slightly across the sealing segment in a loosening or tightening direction. Since in the production of the hose connection as a shaped plastic part, usually axial mold separation burrs appear in the region of the retaining segment which penetrate the wall within the hose line and thus create longitudinal grooves, these longitudinal grooves could move into the region of the sealing surface and there form axial leakage paths through the sealing segment.

This is reliably prevented by means of the present disclosure, in that the line is also securely fixed against twisting which would promote axial displacement. And thus the inner seal of the hose line on the hose connection according to this disclosure is also improved, since the hose line is securely held in place against any movement relative to the sealing segment.

Thus a second radial clamp in the region of the sealing section is not required, which permits a simplified hose assembly.

Moreover, the embodiment with the rib structure also leads to a mechanical reinforcement of the hose connection in an advantageous manner, so that increased radial clamping forces are possible. This also contributes to the desired, good mechanical hold of the hose line.

BRIEF DESCRIPTION OF THE DRAWINGS

Preferred exemplary embodiments of the invention are presented below, with reference to the figures, and explain the invention in greater detail. We have:

FIG. 5 depicts a second design of a somewhat reduced side view of the hose line connector in comparison with FIG. 1, FIG. 6 depicts a third embodiment of the hose line connector in a side view analogous to FIGS. 1 and 5, FIG. 7 depicts a longitudinal cross section along plane VII-VII as per FIG. 6, FIG. 8 depicts an enlarged cross section along plane VIII-VIII as per FIG. 6, FIG. 9 depicts a partial axial cross section along plane IX-IX as per FIG. 8, FIG. 10 depicts an additional, fourth embodiment of the invented connector, again shown in side view, FIG. 11 depicts a longitudinal cross section along plane XI-XI according to FIG. 10, FIG. 12 depicts an enlarged cross section along plane XII-XII as per FIG. 10, FIG. 13 depicts a semi-axial cross section along plane XIII-XIII as per FIG. 12, FIG. 14 depicts a side view of a fifth exemplary example of a line connector according to the present disclosure, FIG. 15 depicts a longitudinal cross section along plane XV-XV as per FIG. 14, FIG. 16 depicts an enlarged cross section along plane XVI-XVI as per FIG. 14, FIG. 17 depicts a semi-axial cross section along plane XVII-XVII as per FIG. 16.

DETAILED DESCRIPTION

Figure 1:
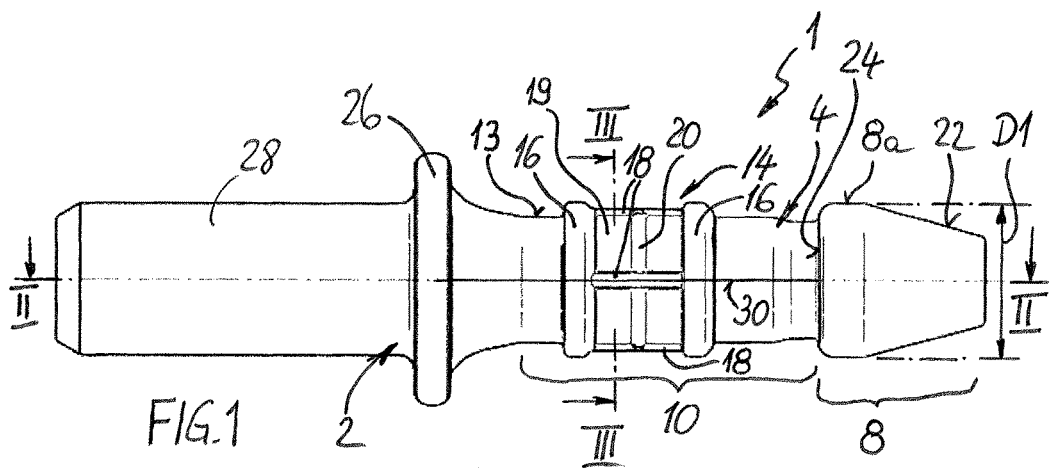
FIG. 1 depicts an enlarged side view of the hose line connector in a first embodiment.
Figure 2:
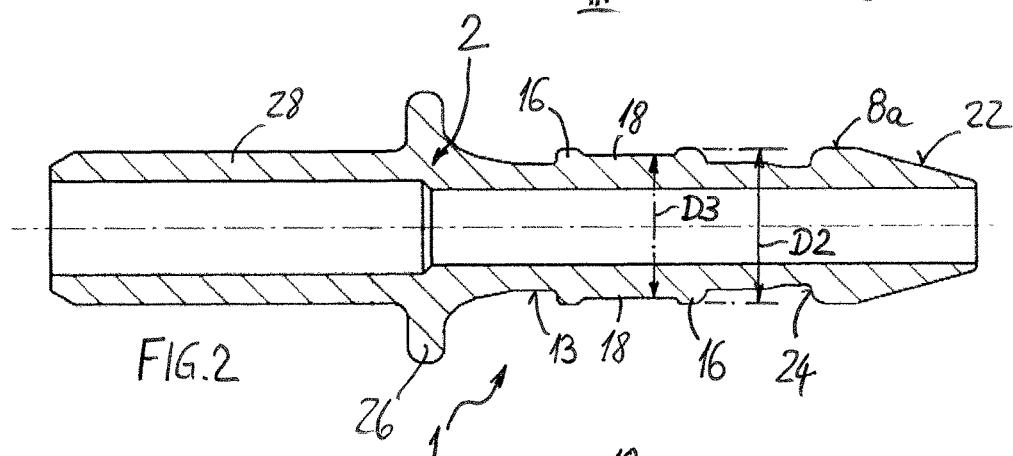
FIG. 2 depicts an axial longitudinal cross section along plane II-II of FIG. 1.
Figure 4:
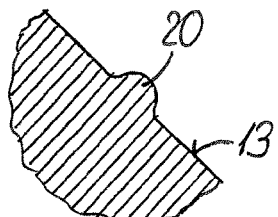
FIG. 4 depicts a partial axial cross section along plane IV-IV of FIG. 3.
Figure 3:
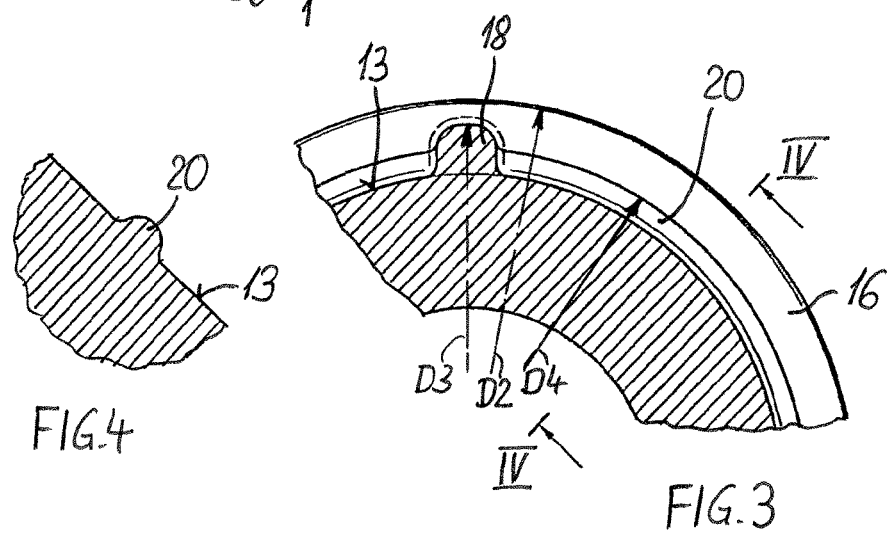
FIG. 3 depicts an additional, enlarged partial cross section along the plane III-III according to FIG. 1 and also according to FIG. 5.
Figure 18:
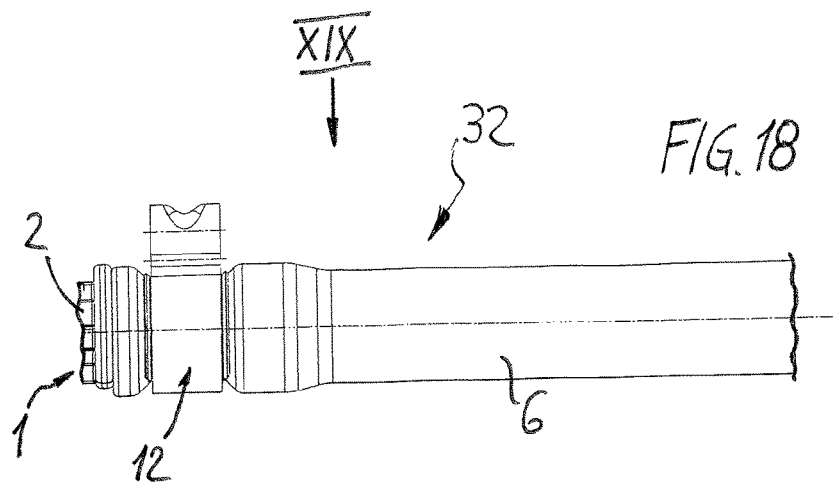
FIG. 18 depicts a side view of a section of a line set according to the disclosure, with a hose line connector and a hose line slipped on and clamped with a hose clamp.
Figure 19:
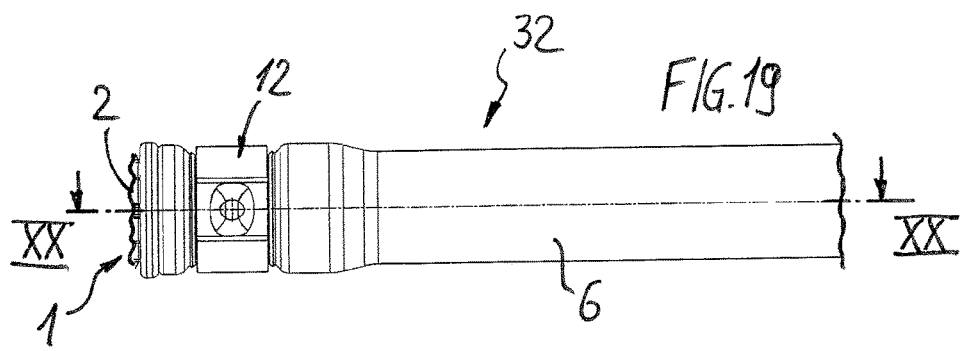
FIG. 19 depicts a view of the line set in the direction of arrow XIX as per FIG. 18.

With regard to the following description it is expressly emphasized that the invention is not restricted to the exemplary embodiments and is not limited to all, or to several features of described combinations of features; rather each individual part feature of the/each exemplary embodiment can also have an inventive significance detached from all other part features described in connection therewith, and also in combination with any other features of another exemplary embodiment and also independently of the combinations of features and back-references to the claims.

A hose-line connector 1 comprises a connection part 2 having at least one elongated hose connection 4 for slipping on a hose line like that depicted, for example, in FIGS. 18 to 21. The connection part 2, together with the hose connection 4, is designed as a single molded piece, in particular from plastic. The single molded piece can be suitably produced from at least one polymer, in particular a polyamide. For example, the single molded piece can be produced from PA12, PA612, PA1012, PA1010, PA610, PA11, PA66, PA6 or PPA (polyphthalamide), PPO (polyphenylene oxide and/or polyether), PSU (polysulfone), PES (polyether sulfone), PPSU (polyphenylene sulfone), POM (polyoxymethylene) or PP (polypropylene). Furthermore, it is possible that the material of the single molded piece is fiber-reinforced, in particular fiberglass reinforced. A fiberglass-reinforced polyamide, in particular PA12-GF 30 is particularly suitable for the single molded piece.

As is indicated in particular from the side views in FIGS. 1, 5, 6, 10 and 14, the hose connection 4 features on one free, front end a sealing segment 8 and axially thereon, a retaining segment 10 as clamping region for radial, circumferential clamping of the slipped on hose line 6 by means of a suitable hose clamp 12; in this regard see FIGS. 18 to 21. The sealing segment 8 features smooth, burr-free sealing surface 8a in the circumferential direction.

In this respect the present disclosure provides that the retaining segment 10 bears on its cylindrical, outer circumference 13 a radially protruding rib structure 14 with at least one circumferential rib 16 in the shape of an annular crevice, and at least one longitudinal rib 18 extending across at a slant to the axial direction and/or distributed axially across the circumference. The rib structure 14 can also feature at least two longitudinal ribs 18, in particular—as illustrated—four longitudinal ribs 18 distributed uniformly across the circumference, so that they are each spaced by 90° to each other in the circumferential direction.

Figure 22:
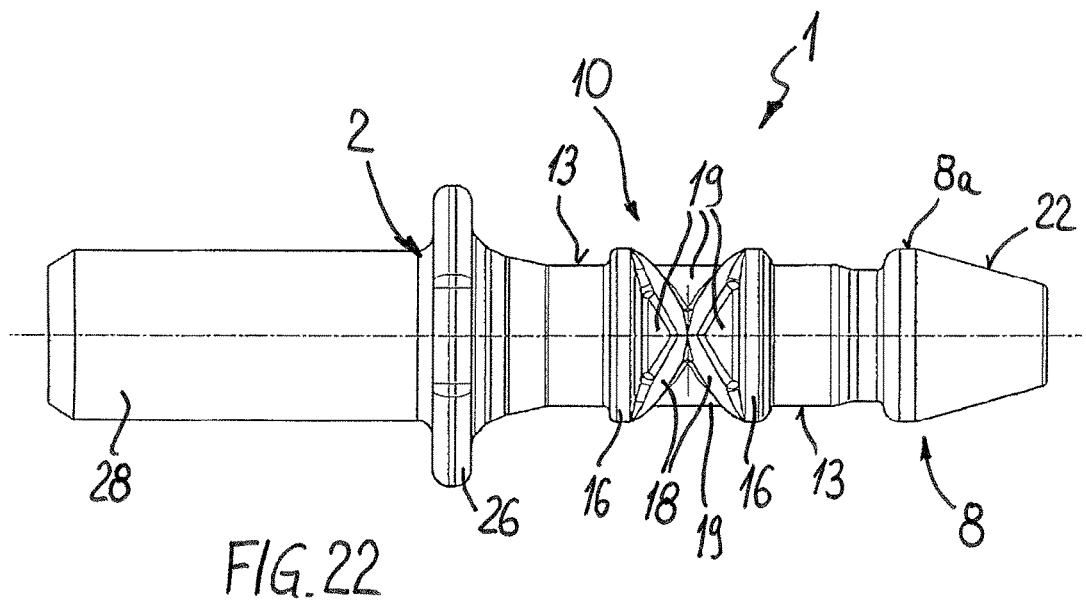
FIGS. 22 and 23 depict two additional exemplary embodiments, shown in side view, of hose line connectors according to the present disclosure.

In the illustrated exemplary embodiments according to FIGS. 1 to 17, the longitudinal ribs 18 each extend in the axial or axis-parallel direction. Alternatively or additionally, the longitudinal ribs 18 can also extend at least partly at a slant to the longitudinal axis, and specifically in a straight line, or also in the shape of zig-zag or wavy lines. In addition, at least two slanting longitudinal ribs 18 can intersect, for example, as is illustrated in FIG. 22. Depending on the geometry, only one longitudinal rib 18 can be sufficient, if it runs, for example in a zig-zag shape in the circumferential direction and axially back and forth between the circumferential ribs 16; see FIG. 23. Alternatively, a meandering progression will be possible. It is notable that all ribs 16, 18 of the rib structure 14 form comb-like recesses 19 between each other into which the material of the hose wall of the hose line 6 is pressed during radial clamping; see in particular FIG. 20.

Figure 23:
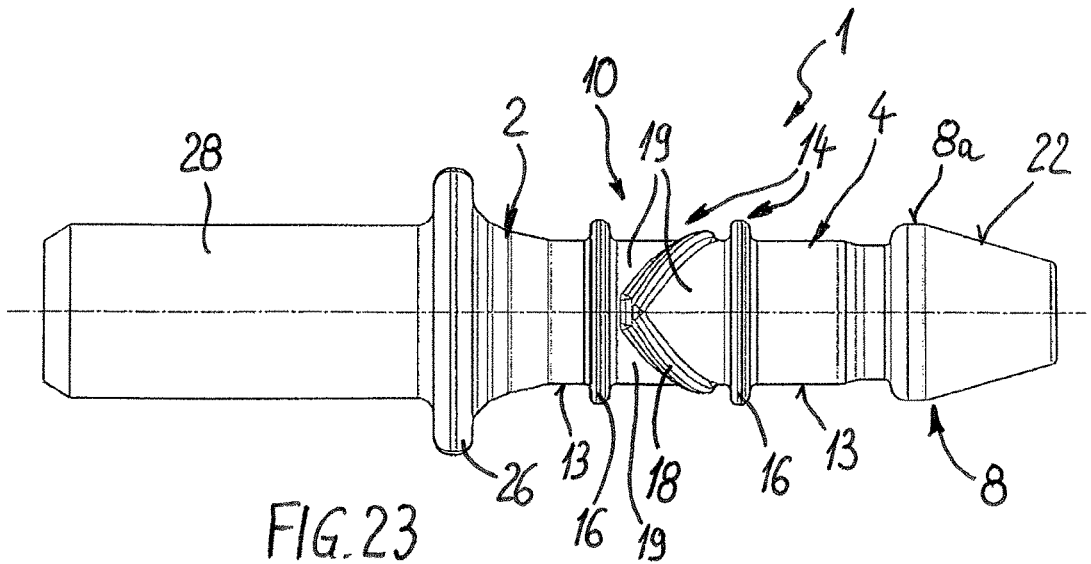

In the exemplary embodiments according to FIGS. 1 to 13 and also in FIGS. 22 and 23, the rib structure 14 features at least two axially-spaced circumferential ribs 16, wherein the longitudinal ribs 18 are arranged between each two axially adjacent circumferential ribs 16. In the embodiments according to FIGS. 1 to 4 and FIGS. 6 to 13 and 22, 23, the rib structure 14 features exactly two axially spaced circumferential ribs 16 with longitudinal ribs 18 extending between them and adjoining on both ends directly to or at a small distance to the circumferential ribs 16. In the design variant according to FIG. 5, three equally axially spaced circumferential ribs 16 are provided, and the longitudinal ribs 18 run between each two adjacent circumferential ribs 16. Thus here virtually a double rib structure is created with common, central circumferential rib 16. The middle circumferential rib 16 can also be positioned so as not to be in a central position.

In these designs according to FIGS. 1 to 13 it is additionally provided that at least one annular web-shaped supplemental rib 20, extending in the circumferential direction, is arranged between each two adjacent circumferential ribs 16; the supplemental rib is positioned in particular centrally between the circumferential ribs 16.

The geometric design of the rib structure 14 in relation to the sealing segment 8 with its sealing surface 8a will be described below.

Figure 20:
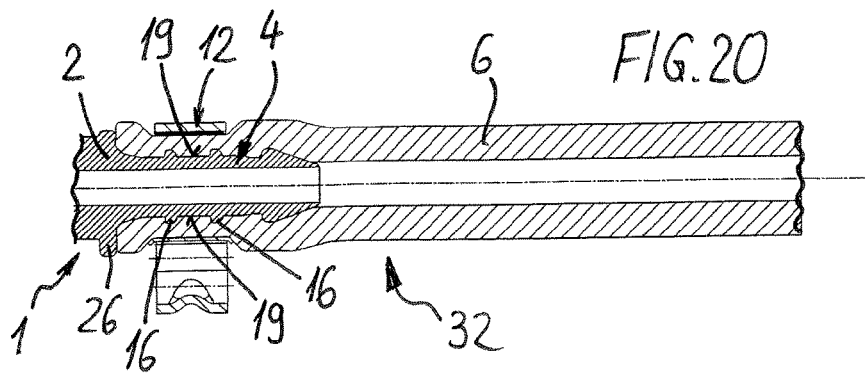
FIG. 20 depicts a longitudinal cross section through the line set along plane XX-XX as per FIG. 19.

The sealing segment 8 has an outer diameter D1 in the region of its sealing surface 8a which is fitted to the inside diameter of the hose line 6 to be slipped on, such that the latter in the slipped-on state is elastically expanded and thus rests against the sealing surface 8a with a circumferential, radial contact force toward the inner seal; see FIG. 20. The circumferential ribs 16 define an outer diameter D2. The longitudinal ribs 18 with their outer edges jointly define an outer diameter D3. Finally, the supplemental rib 20 features an outer diameter D4.

In the first design according to FIGS. 1 to 4 the invention provides that the outer diameter D2 of the circumferential ribs 16 is equal to or at least approximately equal to the outer diameter D1 of the sealing segment 8 in the region of the sealing surface 8a. The outer diameter D3 defined by the longitudinal ribs 18 is slightly smaller than the outer diameter D2 of the circumferential ribs 16. Furthermore, the outer diameter D4 of the supplemental rib 20 is yet again slightly smaller than the outer diameter D3 defined by the longitudinal ribs 18. In a concrete design, the diameter differences between D2 and D3 on the one hand, and between D3 and D4 on the other, are each about 0.4 mm, corresponding to a radius difference of about 0.2 mm. The measured radial height of the circumferential ribs 18, proceeding from the circumferential surface 13, is in the range of 0.4 to 0.8 mm and preferably amounts to about 0.6 mm. The radial height of the longitudinal ribs 18 is about 0.2 mm smaller and thus preferably amounts to about 0.4 mm. The radial height of the supplemental rib 20 in turn is about 0.2 mm smaller; thus it amounts preferably to about 0.2 mm.

The design according to FIG. 5 with two equivalent, axially adjacent rib structures 14 corresponds to the design per FIGS. 1 to 4 with regard to the diameter conditions.

In the design depicted in FIGS. 6 to 9, in turn, the outer diameter D2 of the circumferential ribs 16 corresponds at least approximately to the outer diameter D1 of the sealing segment 8. In addition, the outer diameter D3 defined here also by the longitudinal ribs 18 corresponds to the outer diameter D2 of the circumferential ribs 16. Solely the outer diameter D4 of the supplemental rib 20 is slightly smaller, and specifically preferably by about 0.4 mm, which corresponds to a radius difference of about 0.2 mm.

In the design according to FIGS. 10 to 13, all named diameters D1, D2, D3 and D4 are at least approximately of equal size.

As regards the embodiment according to FIGS. 14 to 17, the rib structure 14 herein has only one circumferential rib 16, which is disposed preferably in the axial middle region of the longitudinal ribs 18. Consequently the longitudinal ribs 18 each extend partially away from both sides of the circumferential rib 16. In this exemplary embodiment, again the outer diameter D1 of the sealing surface 8a and the outer diameter D2 of the circumferential rib 16 are equal or are at least approximately equal. Moreover, the outer diameter D3 defined by the longitudinal ribs 18 is at least approximately equal to the outer diameter D2 of the circumferential rib 16.

In all embodiments the rib structure 14 extends across and beyond an axial, longitudinal region of the hose connection 4, which is designed so as to adapt to the axial width of a hose clamp 12 to be used for clamping of a slipped on hose line 6, so that the rib structure 14 directly supports the hose clamp 12 via the hose line 6 against tipping relative to the connection longitudinal axis. In the designs according to FIGS. 1 to 13 this is ensured primarily through the outer circumferential ribs 16. Therefore the other ribs 18 and/or 20 can be designed with smaller diameters D3, D4, as is the case in FIGS. 1 to 5 and with respect to the supplemental rib 20 in FIGS. 6 to 9. In the design according to FIGS. 14 to 17 with only one, middle circumferential rib 16, the tipping support is ensured due to the longitudinal ribs 18 formed with the same diameter and corresponding length.

As is illustrated as an example in the depictions according to FIGS. 6 to 17, the sealing surface 8a of the sealing segment 8 can be designed as so-called sealing lenses with a convex contour in longitudinal cross section. In the designs per FIGS. 1 to 5, the sealing surface 8a of the sealing segment 8 features an axially lengthened cylindrical or slightly conical surface section. The term "slightly conical" means that the sealing surface 8a is tapered at an angle of 0. degree to 3. degree, for example, due to an axial de-molding toward the free end. The length of the cylindrical or slightly conical surface segment of the sealing surface 8a in a physical example amounts to 0.5 mm to 2.0 mm, in particular about 1.0 mm.

Moreover, the sealing segment 8 features at the free end a slanted conical insertion surface 22 which promotes slipping on of the hose line 6, in that the hose line 6 is elastically expanded over the slanted insertion surface 22 during the slip on process.

The sealing segment 8 and/or the sealing surface 8a passes over a radial diameter-reducing stage 24 into the retaining segment 10 and its initially cylindrical circumferential surface 13.

It should also be mentioned that the hose connection 4—on its region opposite the free end and the sealing segment 8 and adjoining the retaining segment 10—features a contact element 26 to limit the insertion for the slipped on hose line 6. This contact element 26 can be formed preferably by means of a circumferential annular web.

On the side opposite the sealing segment 8 adjoining the hose connection 4 and the contact element 26, the connection part 2 can feature any kind of connection segment 28, as illustrated for example in the form of a cylindrical connection lug. But the hose connection 4 can also be joined as a single part to any other connection part or other aggregate.

As was already mentioned above, the connection part 2 together with the hose connection 4 is designed preferably as a molded plastic part. To do so, preferably the sealing segment 8 is formed up to the radial stage 24 at the transition to the retaining segment 10, with an axial de-molding and thus on the sealing surface 8a and on the slanting insertion surface 22 is free of molding burrs, whereas in the remaining region axial progressing molding burrs 30 can be formed by a radial de-molding, as is indicated in the particular side views. A mold separation plane is selected here such that the molding burrs 30 extend axially over the rib structure 14, and in particular over two diametrically opposing, axial longitudinal ribs 18. Thus the molding burrs 30 also contribute to secure retention of the hose line 6, in particular to prevent twisting.

Figure 21:
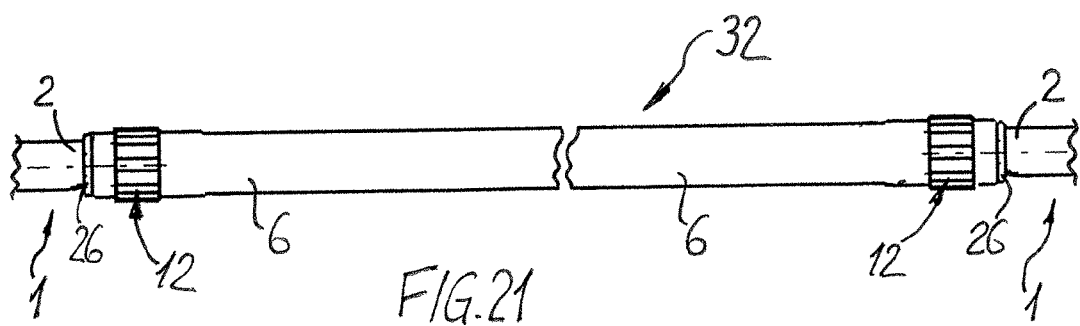
FIG. 21 depicts a side view of a line set with a shortened depicted hose line and two end-side line connectors according to the invention.

FIGS. 18 to 19 again illustrate a line set 32, as least in sections, which consists of a hose line 6 and at least one end-side hose line connector 1 according to the invention. The particular line end is pushed onto the hose connection 4 under regional, radial elastic expansion and is clamped radially in the region of the retaining segment 10 by means of a hose clamp 12. According to FIGS. 18 to 20 the hose clamp 12 can be designed as an ear clamp. In FIG. 21, for example, squeeze casings are illustrated as examples of hose clamps 12. Due to the invented rib structure 14 and the resultant mechanical reinforcement of the hose connection 4, a large clamping or squeeze force can be applied, which is preferably 15% to 20% greater than for a conventional hose connection without the invented rib structure 14 and with the same radial deformation of the connection wall.

The invention is not restricted to the illustrated and described exemplary embodiments, but rather encompasses all equivalent designs within the sense of the invention. It is expressly emphasized that the exemplary embodiments are not restricted to all features in combination; rather each individual part feature by itself can also have inventive significance detached from all other part features. Furthermore, the invention is not limited to the combination of features defined in the particular, independent claim, but rather can be defined by any other particular combination of certain features of all individual features disclosed. This means that basically practically each individual feature of the particular independent claim can be omitted or replaced by at least one other single feature disclosed elsewhere in the application. In this respect the claims are to be understood solely as a first attempt at formulation of an invention.

The invention claimed is:

1. A hose-line connector for a hose line, the connector comprising:
a connection part having at least one elongated hose connection for slipping the hose line onto the at least one hose connection, wherein the hose connection has a sealing segment having a circumferential sealing surface at a free front end and a retaining segment axially adjacent thereto as a clamping region for the circumferential radial clamping of a hose line that is slipped on an outer cylindrical circumference of the retaining segment, there is a radially protruding rib structure which has at least one annular circumferential rib with a straight cylindrical outer surface and at least two longitudinal ribs distributed about the circumference and extending axially, the sealing portion merging into the retaining portion via a radial step that reduces in diameter the hose connection, the connection part with the hose connection being formed as an integral plastics molding, the sealing portion being formed as far as the radial step at a transition to the retaining portion with axial de-molding and as a result having a circumferentially smooth surface free of molding burrs, and a remaining region of the hose connection being formed with radial de-molding and as a result having axially extending molding burrs, and wherein the circumferential and longitudinal ribs have an identical outside diameter, and wherein chambered recesses are formed by the rib structure in each case between the circumferential and longitudinal, and the chambered recesses extending down to the cylindrical circumference of the retaining segment, and the molding burrs extending axially over the rib structure.

2. The connector according to claim 1, wherein the rib structure comprises at least two longitudinal ribs distributed uniformly across the circumference.

3. The connector according to claim 1, wherein the rib structure comprises at least two axially spaced, circumferential ribs wherein the longitudinal ribs are each arranged between two adjacent circumferential ribs.

4. The connector according to claim 3, wherein at least one supplemental rib extending in the circumferential direction in the shape of an annular web is arranged between each two adjacent circumferential ribs, in particular centrally between the circumferential ribs.

5. The connector according to claim 4, wherein the circumferential ribs have an outer diameter (D2) which at least approximately corresponds to the outer diameter (D1) of the sealing surface of the sealing segment.

6. The connector according to claim 5, wherein the longitudinal ribs together with their outer edges define an outer diameter (D3) which is less than or equal to the outer diameter (D2) of the circumferential ribs.

7. The connector according to claim 6, wherein the supplemental ribs have an outer diameter (D4) which is less than or equal to the outer diameter (D3) of the longitudinal ribs.

8. The connector according to claim 1, wherein the rib structure features a circumferential rib arranged in a middle axial region of the longitudinal ribs.

9. The connector according to claim 8, wherein the longitudinal ribs with their outer edges jointly define an outer diameter (D3) which is equal to the outer diameter (D2) of the circumferential rib, wherein the outer diameter (D2) of the circumferential rib preferably at least approximately corresponds to the outer diameter (D1) of the sealing surface of the sealing segment.

10. The connector according to claim 9, wherein the rib structure extends beyond an axial longitudinal region which is designed in conformance to the axial width of a hose clamp to be used for clamping of a slipped-on hose line such that the rib structure braces the hose clamp against tipping relative to the connection longitudinal axis.

11. The connector according to claim 10, wherein the sealing surface of the sealing segment, known as a sealing lens, is designed such that the longitudinal cross-section thereof has a bulged convex surface contour.

12. The connector according to claim 11, wherein the sealing surface of the sealing segment comprises a cylindrical surface segment.

13. The connector according to claim 12, wherein the sealing segment passes over a radial, diameter-reducing stage into the retaining segment.

14. The connector according to claim 13, wherein the sealing segment displays a conical, slanting insertion surface on its free end.

15. The connector according to claim 14, wherein the hose connection, in the region opposite its free end and adjoining the retaining segment, comprises a contact element to limit the slip-on of the slip-on hose line.

16. The connector according to claim 15, wherein the connection part with the hose connection is formed as a one-piece cast plastic article of fiber-reinforced polyamide, and wherein the molding burrs proceed axially across two diametrically opposing, axial longitudinal ribs of the rib structure.

17. The line set comprising a hose line and one or two hose line connectors according to claim 1, wherein hose-line connector is inserted by its hose connector into one line end of the hose line, wherein the hose line is radially clamped by a hose clamp around the circumference in the region of the retaining segment and of the rib structure of each hose connector.

18. The line set according to claim 17, wherein each hose clamp is designed as an ear clamp or as a squeeze casing.

19. The connector according to claim 2, wherein the rib structure comprises four longitudinal ribs distributed uniformly across the circumference.

20. The connector according to claim 1, wherein the longitudinal ribs extend obliquely to the axial direction over a least a portion of a length of the longitudinal ribs.

21. The connector according to claim 1, wherein the rib structure includes only a single circumferential rib.

22. The connector according to claim 1, wherein the rib structure includes at least two axially spaced-apart circumferential ribs having identical outside diameters.

23. The connector according to claim 22, wherein the longitudinal ribs are arranged between in each case two adjacent circumferential ribs.

24. The connector according to claim 1, wherein the longitudinal ribs adjoin the at least one circumferential rib.

25. The connector according to claim 1, wherein the longitudinal ribs extend away from the circumferential rib in each case in part on both sides of the at least one circumferential rib.

26. The connector according to claim 1, wherein the longitudinal ribs have a straight cylindrical outer surface.

\* \* \* \* \*